US007836765B2

(12) United States Patent
Challoner et al.

(10) Patent No.: US 7,836,765 B2
(45) Date of Patent: Nov. 23, 2010

(54) DISC RESONATOR INTEGRAL INERTIAL MEASUREMENT UNIT

(75) Inventors: A. Dorian Challoner, Manhattan Beach, CA (US); David Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 540 days.

(21) Appl. No.: 11/831,822

(22) Filed: Jul. 31, 2007

(65) Prior Publication Data

US 2010/0024546 A1 Feb. 4, 2010

(51) Int. Cl.
*G01P 9/04* (2006.01)
(52) U.S. Cl. .................................. 73/504.12; 73/504.13
(58) Field of Classification Search .................. 73/510, 73/511, 504.12, 504.13, 504.04
See application file for complete search history.

(56) References Cited

U.S. PATENT DOCUMENTS

| 392,650 | A | | 11/1888 | Waltrous |
| 4,841,773 | A | * | 6/1989 | Stewart ........................ 73/510 |
| 4,898,031 | A | | 2/1990 | Oikawa et al. |
| 5,203,208 | A | | 4/1993 | Bernstein |
| 5,226,321 | A | * | 7/1993 | Varnham et al. .......... 73/514.02 |
| 5,421,312 | A | | 6/1995 | Dawson |
| 5,578,976 | A | | 11/1996 | Yao et al. |
| 5,646,346 | A | | 7/1997 | Okada |
| 5,665,915 | A | | 9/1997 | Kobayashi et al. |
| 5,728,936 | A | | 3/1998 | Lutz |
| 5,783,749 | A | | 7/1998 | Lee et al. |
| 5,894,090 | A | * | 4/1999 | Tang et al. ................ 73/504.02 |
| 5,905,202 | A | | 5/1999 | Kubena et al. |
| 5,920,012 | A | | 7/1999 | Pinson |
| 5,987,985 | A | | 11/1999 | Okada |
| 6,009,751 | A | | 1/2000 | Ljung |

(Continued)

FOREIGN PATENT DOCUMENTS

DE 44 42 033 A1 5/1996

(Continued)

OTHER PUBLICATIONS

Wright et al., "The HRG Applied to a Satellite Attitude Reference System," Guidance and Control, AASAAS, 1994, 86:1-13.

(Continued)

*Primary Examiner*—Helen C. Kwok
(74) *Attorney, Agent, or Firm*—Canady & Lortz LLP; Bradley K. Lortz

(57) ABSTRACT

Sensing motion of multiple degrees of freedom for an integral inertial measurement unit provided through the operation of a single centrally mounted planar disc resonator having a single driven mode in a single vacuum enclosure is disclosed. The resonator comprises a circumferentially slotted disc having multiple internal capacitive electrodes within the slots in order to excite a single in-plane driven vibration and sense in-plane vibration modes or motion of the resonator. In addition, vertical electrodes disposed below and/or above the resonator may also be used to sense out-of-plane vibration or motion. Acceleration sensing in three orthogonal axes can be obtained by sensing two lateral modes of the disc resonator in the plane of the disc from the internal electrodes and a vertical mode from the vertical electrodes.

18 Claims, 12 Drawing Sheets

U.S. PATENT DOCUMENTS

| | | | |
|---|---|---|---|
| 6,044,705 A | 4/2000 | Neukermans et al. | |
| 6,094,984 A | 8/2000 | Asano et al. | |
| 6,145,380 A | 11/2000 | Macgugan et al. | |
| 6,151,964 A | 11/2000 | Nakajima | |
| 6,164,134 A | 12/2000 | Cargille | |
| 6,182,352 B1 | 2/2001 | Deschenes et al. | |
| 6,263,552 B1 | 7/2001 | Takeuchi et al. | |
| 6,282,958 B1 | 9/2001 | Fell et al. | |
| 6,289,733 B1 | 9/2001 | Challoner et al. | |
| 6,360,601 B1 | 3/2002 | Challoner et al. | |
| 6,367,786 B1 | 4/2002 | Gutierrez et al. | |
| 6,481,284 B2 | 11/2002 | Geen et al. | |
| 6,481,285 B1 | 11/2002 | Shkel et al. | |
| 6,515,278 B2 | 2/2003 | Wine et al. | |
| 6,629,460 B2 | 10/2003 | Challoner | |
| 6,944,931 B2 * | 9/2005 | Shcheglov et al. | 29/595 |
| 7,040,163 B2 | 5/2006 | Shcheglov et al. | |
| 7,123,111 B2 * | 10/2006 | Brunson et al. | 331/116 M |
| 7,168,318 B2 | 1/2007 | Challoner et al. | |
| 7,258,011 B2 * | 8/2007 | Nasiri et al. | 73/514.32 |
| 7,258,012 B2 * | 8/2007 | Xie | 73/514.32 |
| 7,281,406 B2 * | 10/2007 | Mase | 73/1.37 |
| 7,401,397 B2 | 7/2008 | Shcheglov et al. | |
| 2002/0066317 A1 | 6/2002 | Lin | |
| 2003/0010123 A1 | 1/2003 | Malvern et al. | |
| 2003/0029238 A1 | 2/2003 | Challoner | |
| 2004/0055380 A1 | 3/2004 | Shcheglov et al. | |
| 2005/0017329 A1 | 1/2005 | Hayworth et al. | |
| 2006/0162146 A1 | 7/2006 | Shcheglov et al. | |
| 2007/0084042 A1 | 4/2007 | Challoner et al. | |
| 2008/0295622 A1 | 12/2008 | Challoner | |

FOREIGN PATENT DOCUMENTS

| | | |
|---|---|---|
| DE | 19719601 A1 | 11/1998 |
| EP | 0 461 761 A1 | 12/1991 |
| EP | 1055908 A1 | 11/2000 |
| EP | 0 971 208 A2 | 12/2000 |
| JP | 01129517 A | 5/1989 |
| WO | WO 96/38710 | 12/1996 |
| WO | WO 98/15799 | 4/1998 |
| WO | WO 00/68640 | 11/2000 |
| WO | WO 01/44823 A | 6/2001 |
| WO | WO 01/74708 A | 10/2001 |

OTHER PUBLICATIONS

Putty et al., "A Micromachined Vibrating Ring Gyroscope," Solid State Sensor and Actuator Workshop, Transducer Research Foundation, Hilton Head, 1994, pp. 213-220.

Tang et al., "A Packaged Silicon MEMS Vibratory Gyroscope for Microspacecraft," Proceedings IEEE, 10th Annual Int. Workshop on MEMS, Japan, 1997, pp. 500-505.

Barbour et al., "Micromechanical Silicon Instrument and Systems Development at Draper Laboratory," AIAA Guidance Navigation and Control Conference, 1996, Paper No. 96-3709.

Johnson et al., "Surface Micromachined Angular Rate Sensor," A1995 SAE Conference, Paper No. 950538, pp. 77-83.

Fujita et al., "Disk-shaped bulk micromachined gyroscope with vacuum sealing," Sensors and Actuators A:Physical, vol. 82, May 2000, pp. 198-204.

Skulski et al., "Planar resonator sensor for moisture measurements", Microwaves and Radar, 1998, MIKON '98, 12th International Conf., vol. 3, May 20-22, 1998, pp. 692-695.

Pryputniewicz et al., "New Approach to Development of Packaging for MEMS Inertial Sensors," Proceedings of 2001 ASME Int. Mech. Eng. Cong. and Expo., Nov. 11-16, 2001, NY.

* cited by examiner

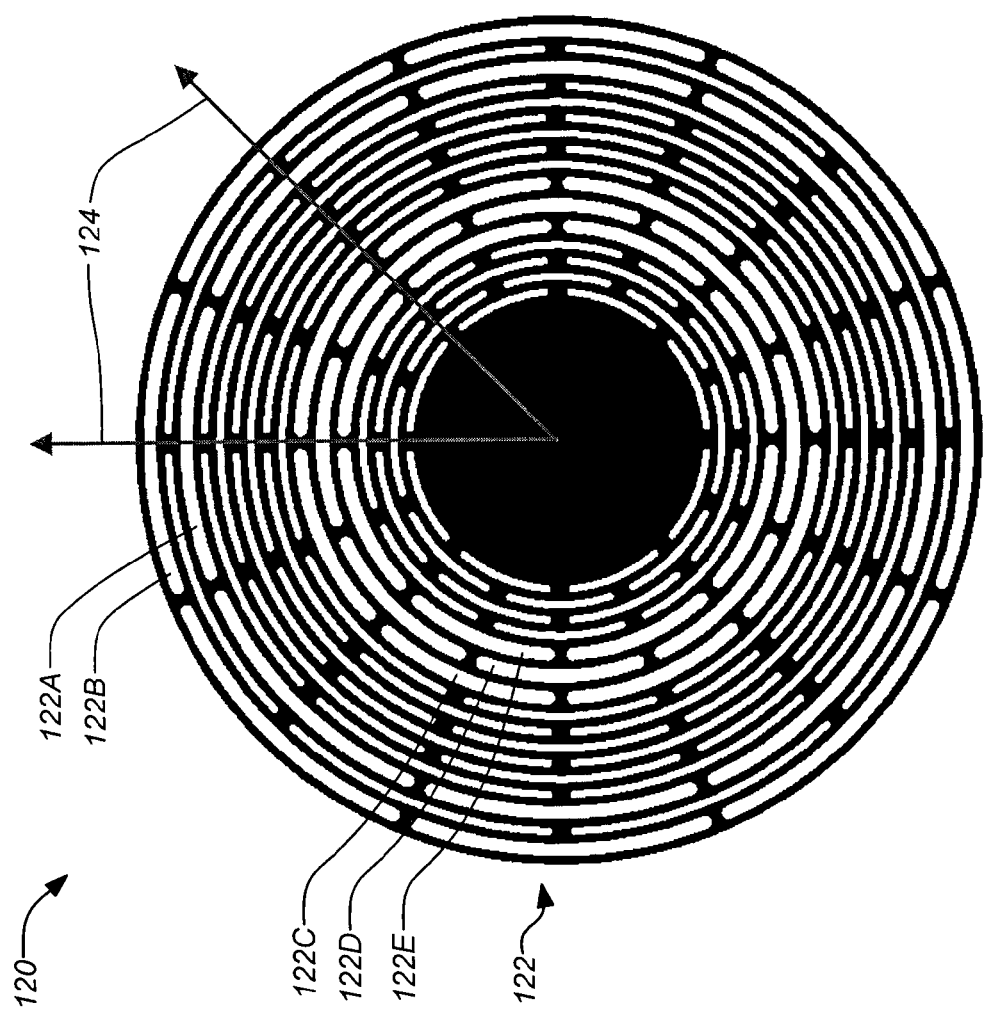

DISC RESONATOR INTEGRAL INERTIAL MEASUREMENT UNIT

CROSS-REFERENCE TO RELATED APPLICATIONS

This application is related to the following co-pending patent applications, which are all incorporated by reference herein:

U.S. patent application Ser. No. 11/615,872, filed Dec. 22, 2006, and entitled "VIBRATORY GYROSCOPE WITH PARASITIC MODE DAMPING", by David Whelan et al.;

U.S. patent application Ser. No. 11/371,596, filed Mar. 9, 2006, and entitled "ISOLATED PLANAR RESONATOR GYROSCOPE WITH INTERNAL RADIAL SENSING AND ACTUATION", by Kirill V. Shcheglov et al.; and U.S. patent application Ser. No. 11/199,004, filed Aug. 8, 2005, and entitled "INTEGRAL RESONATOR GYROSCOPE", by Kirill V. Shcheglov et al.

BACKGROUND OF THE INVENTION

1. Field of the Invention

The present invention relates to gyroscopes, and in particular to planar resonator gyroscopes or inertial sensors and their operation. More particularly, this invention relates to a planar resonator sensor used in an inertial measurement unit to sense motion for multiple degrees of freedom.

2. Description of the Related Art

An inertial measurement units (IMU) is a critical sensing system, particularly for aerospace applications such as aircraft or spacecraft vehicles. However, as the costs of IMUs are reduced, they may be employed in automobiles or any moving object. They provide comprehensive sensing of the relative motion of the vehicle without using a reference external to the vehicle. Typically, the IMU delivers acceleration sensing along three orthogonal axes as well as rotation rate sensing about three orthogonal axes to provide a complete representation of the vehicle movement. Position information may be readily derived from this sensed data, particularly when combined with position reference information. Conventional IMUs rely on multiple different physical sensors to provide the complete motion sensing. Typically, each individual sensor for the IMU is capable of sensing either along a single axis for acceleration or about a single axis for rotation. Thus, an IMU may utilize sensing information from three accelerometers each aligned to different orthogonal axes along with three gyroscopes each sensing rotation about three orthogonal axes. Providing rate sensing (e.g., from a gyro) is generally more challenging than providing acceleration sensing. Much work has been done in recent years to develop higher precision sensing (particularly gyroscopic sensing) at lower costs.

Conventional mechanical gyroscopes are used to determine direction of a moving platform based upon the sensed inertial reaction of an internally moving proof mass. A typical electromechanical gyroscope comprises a suspended proof mass, gyroscope case, pickoffs, torquers and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that must be in close proximity to the proof mass are mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Older conventional mechanical gyroscopes were very heavy mechanisms by current standards, employing relatively large spinning masses. A number of recent technologies have brought new forms of gyroscopes, including optical gyroscopes such as laser gyroscopes and fiberoptic gyroscopes as well as mechanical vibratory gyroscopes.

Spacecraft generally depend on inertial rate sensing equipment to supplement attitude control. Currently this is often performed with expensive conventional spinning mass gyros (e.g., a Kearfott inertial reference unit) or conventionally-machined vibratory gyroscopes (e.g. a Litton hemispherical resonator gyroscope inertial reference unit). However, both of these are very expensive, large and heavy.

In addition, although some prior symmetric vibratory gyroscopes have been produced, their vibratory momentum is transferred through the case directly to the vehicle platform. This transfer or coupling admits external disturbances and energy loss indistinguishable from inertial rate input and hence leads to sensing errors and drift. One example of such a vibratory gyroscope may be found in U.S. Pat. No. 5,894,090 to Tang et al. which describes a symmetric cloverleaf vibratory gyroscope design and is hereby incorporated by reference herein. Other planar tuning fork gyroscopes may achieve a degree of isolation of the vibration from the baseplate, however these gyroscopes lack the vibrational symmetry desirable for tuned operation.

In addition, shell mode gyroscopes, such as the hemispherical resonator gyroscope and the vibrating thin ring gyroscope, are known to have some desirable isolation and vibrational symmetry attributes. However, these designs are not suitable for or have significant limitations with thin planar silicon microfabrication. The hemispherical resonator employs the extensive cylindrical sides of the hemisphere for sensitive electrostatic sensors and effective actuators. However its high aspect ratio and three-dimensional curved geometry is unsuitable for inexpensive thin planar silicon microfabrication. The thin ring gyroscope (e.g., U.S. Pat. No. 6,282,958, which is incorporated by reference herein) while suitable for planar silicon microfabrication, lacks electrostatic sensors and actuators that take advantage of the extensive planar area of the device. Moreover, the case for this gyroscope is not of the same material as the resonator proof mass so that the alignment of the pickoffs and torquers relative to the resonator proof mass change with temperature, resulting in gyroscope drift.

Most recently, some planar resonator gyroscopes devices have been developed (such as a disc resonator gyroscope) which operate through the excitation and sensing of in-plane vibrational modes of a substantially solid planar resonator. These planar resonators obtain enhanced properties over designs such as the hemispherical or shell resonators by enabling greater drive and sensing area in a compact package that is more easily manufactured and packaged. For example, see U.S. Pat. No. 6,944,931 by Shcheglov et al., issued Sep. 20, 2005 and entitled "INTEGRAL RESONATOR GYROSCOPE" and U.S. Pat. No. 7,043,163 by Shcheglov et al., issued May 9, 2006 and entitled "ISOLATED PLANAR GYROSCOPE WITH INTERNAL RADIAL SENSING AND ACTUATION."

Further limitations arise in the current art of multiaxis inertial sensors or IMUs that operate with reduced performance or at a significantly increased size or cost beyond that of a single-axis gyroscope. Multiple single-axis vibratory gyroscopes of the same manufacture have similar but not identical resonant frequencies. Accordingly, separate control frequencies requiring separate drive electronics and control loops are used for each and interfere with one another electrically or mechanically when mounted in the same vacuum housing. The alternative of mounting them in separate isolated vacuum housings with separate readout electronics is expensive since vacuum packaging is typically more than half the cost of a sensor. In addition, the temperature and vacuum levels for each sensor may vary independently resulting in the need for separate compensation electronics.

In view of the foregoing, there is a need in the art for compact, inexpensive, inertial measurement units. There is a need for such inertial measurement units for navigation and spacecraft payload pointing and other applications. To this end, there is also a need for systems and methods to operate planar resonators to yield sensing motion for multiple degrees of freedom including acceleration sensing along three orthogonal axes and rotation sensing about three orthogonal axes. There is need to have a single vacuum package for all three gyroscopes to reduce cost and have the same vacuum level, temperature and drive frequency for all three gyroscopes and preferably the same driven motion used for sensing all three axis rates. As detailed below, the present invention satisfies these and other needs.

SUMMARY OF THE INVENTION

Sensing motion of multiple degrees of freedom for an inertial measurement unit provided through the operation of a single centrally mounted planar disc resonator is disclosed. The resonator comprises a circumferentially slotted disc having multiple internal capacitive electrodes within the slots in order to excite and sense vibration modes of the resonator. In addition, vertical electrodes disposed below and/or above the resonator may also be used. Acceleration sensing in three orthogonal axes can be obtained by sensing lateral motion of the disc resonator in two directions in the plane of the disc from the internal electrodes and vertical motion from the vertical electrodes. Rotation sensing about three orthogonal axes can also be obtained with a single reactionless driven mode by sensing Coriolis forces from two in plane rotation axes inducing two out of plane rocking modes of the resonator in addition to sensing an out of plane rotation rate in the known manner. Sensing motion of two or more of the six degrees of freedom may be performed by a single disc resonator.

A typical method embodiment of the invention comprises the steps of driving a plurality of drive electrodes disposed internal to a disc resonator to excite a common driven mode of the disc resonator that induces three sensing modes of the disc resonator, and demodulating three response signals from a plurality of sense electrodes to sense the three response modes of the disc resonator. The three demodulated response signals comprise rotation measurement about three substantially orthogonal axes. The disc resonator may comprise a circumferentially slotted disc and the plurality of drive electrodes and at least some of the plurality of sense electrodes are disposed within slots of the disc resonator and the common driven mode comprises a reactionless disc mode. At least one of the three response modes may comprise an in-plane elliptical mode for measuring an in plane rotation rate about a substantially perpendicular out of plane axis of the disc resonator. In some embodiments, the common drive mode and the three response modes operate at a common frequency. The disc resonator may be tuned such that the common driven mode and the three sensing modes operate at the common frequency.

Further embodiments of the invention may employ sensing acceleration along two substantially orthogonal lateral in plane axes of the disc resonator measured with the internal sense electrodes of the disc resonator.

In some embodiments of the invention the plurality of sense electrodes may comprise one or more vertical electrodes adjacent to a planar side of the disc resonator. The one or more vertical electrodes adjacent to the planar side of the disc resonator may be used for sensing acceleration along a substantially vertical out of plane axis of the disc resonator measured. In addition, two of the three response modes may each comprise an out of plane rocking mode of the disc resonator for measuring an out of plane rotation rate about a substantially in plane axis of the disc resonator measured with the one or more vertical electrodes adjacent to the planar side of the disc resonator. Sensing acceleration along two substantially orthogonal lateral in plane axes of the disc resonator may also be combined with sensing acceleration along a substantially vertical out of plane axis of the disc resonator both measured with the one or more vertical electrodes adjacent to the planar side of the disc resonator sensing an out of plane mode of the disc resonator. In addition, a remaining one of the three response modes may comprise an in-plane elliptical mode for measuring a rotation rate about a substantially perpendicular out of plane axis of the disc resonator.

In a similar manner, a typical sensor embodiment of the invention may include a centrally mounted disc resonator including a plurality of drive electrodes disposed internal to the disc resonator and a plurality of sense electrodes, a drive circuit for applying a sinusoidal carrier voltage to the plurality of drive electrodes to excite a common driven mode of the disc resonator that induces three sensing modes of the disc resonator, and a sense circuit for demodulating three response signals from a plurality of sense electrodes to sense the three response modes of the disc resonator, where the three demodulated response signals comprise rotation measurement about three substantially orthogonal axes. Sensor embodiments of the invention may be further modified consistent with the method and/or system embodiments described herein.

BRIEF DESCRIPTION OF THE DRAWINGS

Referring now to the drawings in which like reference numbers represent corresponding parts throughout:

FIG. 1C illustrates a geometric pattern for an exemplary planar resonator structure operable with an embodiment of the present invention;

DETAILED DESCRIPTION OF THE PREFERRED EMBODIMENT

1. Overview

Figure 1A:
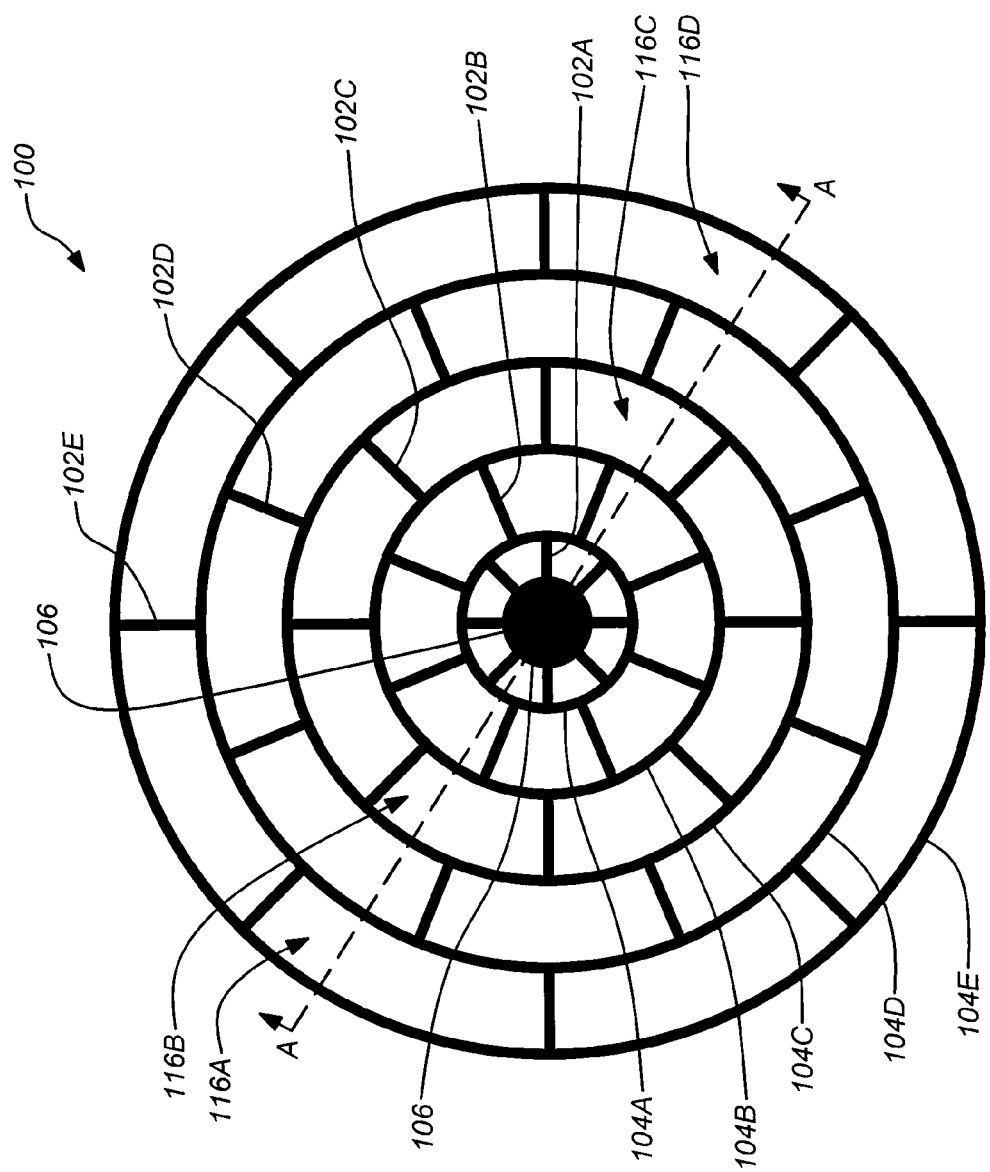
FIG. 1A depicts a schematic top view of an isolated resonator for a sensor which may be operated in accordance with an embodiment of the invention.

In the following description including the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Embodiments of the present invention are directed to sensing of multiple degrees of freedom by a single resonator sensor in order to increase sensing efficiency, eliminate multi-axis interference, multiple drive loops and multiple vacuum housings. Thus, the number of discrete sensors that must be used to develop comprehensive sensing of motion for six degrees of freedom (acceleration along three orthogonal axes and rotation about three orthogonal axes) in an IMU can be reduced. In a limiting case, comprehensive sensing can be provided with a single disc resonator. This can provide direct benefits in lower cost and manufacturability of IMUs.

As previously described, embodiments of the present invention can be applied to a planar resonator supported at a central mounting point and with substantially increased sensing capability by utilizing a short solid cylindrical resonator or disc having a substantial useable internal resonator volume, allowing the incorporation of significantly more sensing for the measurement of desirable resonator internal motion. Capacitive electrodes can be embedded internally within the disc and/or disposed above or below the disc to drive and sense different vibration modes of the disc resonator. This use of a planar element, e.g. a disc, results in substantial top and bottom surface areas and a large internal volume for providing additional sensors. A disc provides favorable radial disc modes similar to a cylindrical shell.

Use of the disc resonator structure for in plane rotation sensing in a gyroscope has been previously described. For example, see U.S. Pat. No. 6,944,931 by Shcheglov et al., issued Sep. 20, 2005 and entitled "INTEGRAL RESONATOR GYROSCOPE" and U.S. Pat. No. 7,043,163 by Shcheglov et al., issued May 9, 2006 and entitled "ISOLATED PLANAR GYROSCOPE WITH INTERNAL RADIAL SENSING AND ACTUATION," which are incorporated by reference herein. Embodiments of the present invention employ other sensing modes for the disc resonator which may be used instead or in combination with in plane rotation sensing to obtain simultaneous motion sensing multiple degrees of freedom from a single disc resonator. To capture motion sensing for some degrees of freedom, some out of plane modes of the disc resonator may be employed using one or more vertical electrodes disposed above or below and adjacent to the plane of the disc resonator. As used herein, the terms "in plane" and "out of plane" relate to the plane of the disc resonator.

Embodiments of the present invention uniquely implement a disc resonator that may be employ a common driven mode that is excited to induce three distinct sensing modes to measure rotation rate about three substantially orthogonal axes. For example, the centrally mounted disc may employ a reactionless disc mode (e.g., an in plane elliptical mode) as the common drive mode. (Accordingly, the disc resonator is rigidly mounted rather than mounted on springs.) The three distinct sensing modes, all induced by excitation of the common driven mode, may comprise another in plane elliptical mode (e.g. for sensing in plane rotation about a substantially perpendicular out of plane axis of the disc resonator) and two out of plane rocking modes (e.g. for sensing out of plane rotation about two orthogonal in plane axes). Sensing of the out of plane modes can be accomplished using one or more vertical electrodes adjacent one or both planar sides of the disc resonator. The disc structure may be properly designed and/or tuned to optimize the sensing mode responses, particularly for the out of plane sensing modes. Finally, it should be noted that control and sensing of the device may be implemented under either open or closed loop control. In the case of closed loop control, more precise tuning of the sensing mode frequencies to match the frequency of the common driven mode may be necessary for optimum results. In any case, improved sensitivity may be achieved when the common driven mode and the three response modes operate at a common frequency. Acceleration sensing may also be implemented in disc resonator in conjunction with the rotation sensing. In this case, distortions of the disc that correspond to acceleration measurements are detected using the sense electrodes.

It should be noted that using a common driven mode to induce sensing rotation in three orthogonal axes avoids the complexity and cost of prior art IMU solutions. Separate control frequencies requiring separate drive electronics and control loops that interfere with one another electrically or mechanically when mounted in the same vacuum housing are not needed. Thus, an IMU embodiment of the invention (sensing rotation and acceleration about and along three orthogonal axes—comprising six degrees of freedom) may be implemented as a single vacuum packaged disc resonator.

2. Exemplary Disc Resonator Sensor

FIG. 1A depicts a schematic top view of an isolated disc resonator for the sensor which may be operated in accordance with an embodiment of the invention. The sensor comprises a unique planar resonator 100 which is supported by a rigid central support 106 and designed primarily for in-plane vibration. In the exemplary embodiment, the resonator 100 comprises a disc that includes a number of slots, e.g. 116A-16D (generally referenced as 116) formed from concentric circumferential segments 104A-104E. The circumferential segments 104A-104E are supported by radial segments 102A-102E. The overall diameter of the resonator can be varied depending upon the performance requirements. For example, a 16 mm diameter resonator can provide relatively high machining precision and low noise. Further refinement of the resonator can yield a resonator diameter of only 4 mm at significantly reduced cost.

Figure 1B:
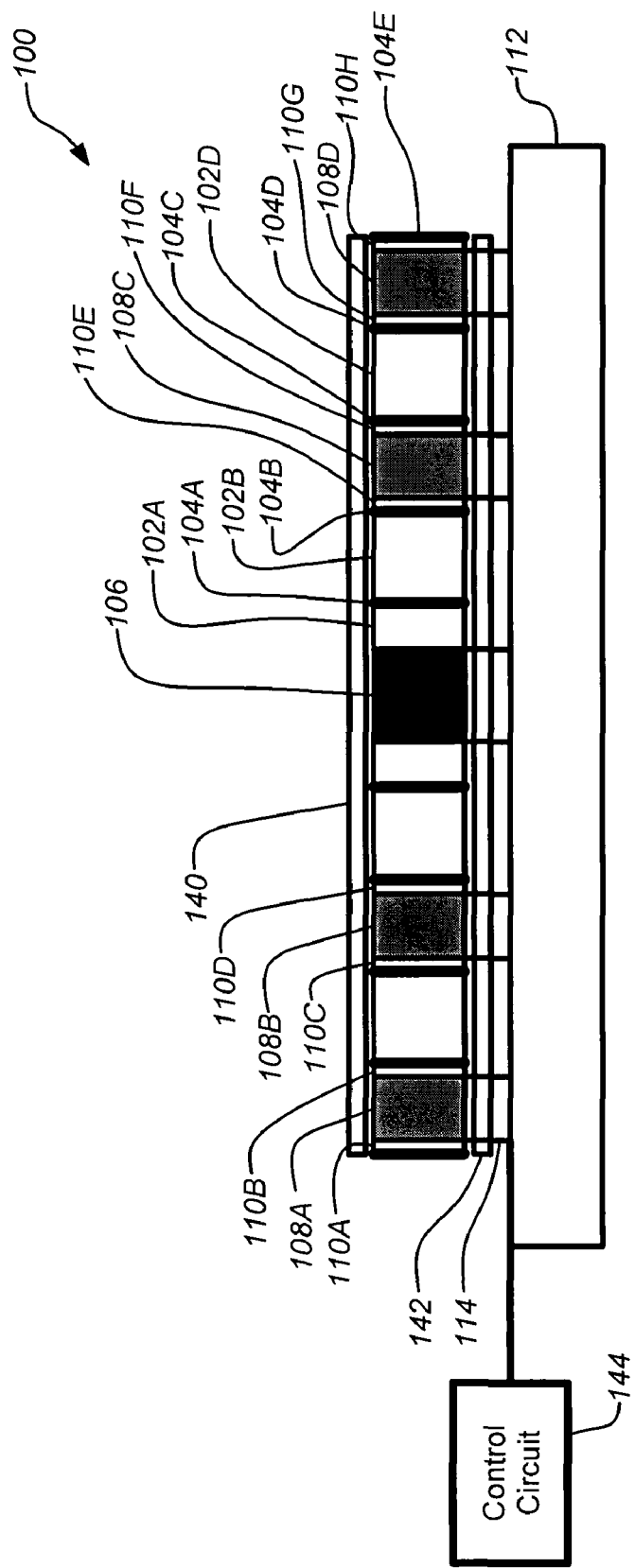
FIG. 1B depicts a side view of the exemplary planar resonator of FIG. 1A.

FIG. 1B depicts a schematic side view of an exemplary isolated resonator 100 of the present invention assembled into a baseplate 112. The central support 106 supports the resonator 100 on the baseplate 112. At least some of the slots 116 in the resonator 100 provide access for the embedded internal electrodes 108A-108D which are also supported on pillars 114 on the baseplate 112. The internal electrodes 108A-108D form capacitive gaps 110A-110H (outboard gaps 110A, 110C, 110F and 110H and inboard gaps 110B, 110D, 110E and 110G) with at least some of the circumferential segments 104A-104E of the resonator 100. These internal electrodes 108A-108D provide for radial excitation of the resonator 100 as well as sensing motion of the resonator 100. To facilitate this each of the electrodes 108A-108D is divided into multiple separate elements to improve control and sensing of the resonator 100. For example, the annular electrode 108B as shown can be divided into two or more elements, at least one acting across the outboard gap 110C and at least one acting across the inboard gap 110D. Vibration is induced in the resonator by separately exciting the elements to produce a biased reaction on the resonator 100 at the electrode 108B location.

In general, the internal excitation electrodes 108B, 108C may be disposed closer to the central support 106 (i.e., within inner slots of the resonator 100) than the electrodes 108A, 108D (i.e., within outer slots of the resonator 100) to improve sensing. However, the arrangement and distribution of the excitation and sensing electrodes 108A-108D can be varied as desired. As will be described hereafter, the internal electrodes 108A-108D are used to drive and sense different in plane modes of the disc resonator to sense motion in multiple degrees of freedom. In further embodiments, additional electrodes can also be used to bias the resonator 100 providing electrostatic tuning or trimming of nonuniformity. Such biasing electrodes can also include multiple separate elements as the excitation and sensing electrodes.

One or more additional vertical electrodes 140, 142 may be disposed adjacent to the planar resonator 100. Although the vertical electrodes 140, 142 are shown as single elements above and below the planar resonator 100, each electrode may comprise multiple distinct elements which may be independently controlled. The upper vertical electrode 140 may be disposed on the inner surface of a housing enclosing the resonator while the lower vertical electrode 142 may be disposed on the baseplate 112. The lower vertical electrode 142 is limited to the available area between the embedded electrodes 108A-108D and the rigid central support 106. The additional vertical electrodes 140, 142 may be used to enhance control of the planar resonator 100. These capacitance electrodes 140, 142 may be used for axial or angular acceleration measurement as well as active damping of the axial and rocking modes of the disc resonator gyroscope.

Operation of the planar resonator 100, e.g. as part of an IMU, will be described in the following section. In general, the various electrodes (embedded in the resonator or adjacent to it) are used to drive a single reactionless vibration mode of the planar resonator as well as sense reactions in other modes to movement of the resonator with a control circuit 144 coupled to each of the electrodes. The design of the control circuit 144 may be readily developed by those skilled in the art to operate in accordance with the teaching herein.

FIG. 1C illustrates a pattern 120 for an exemplary planar resonator 100 of the present invention. This pattern 120 employs numerous concentric interleaved circumferential slots 122. Some of the slots, e.g. 122A-122E are wider to accommodate multiple element internal electrodes. For example, two of the outer rings of wider slots 122A, 122B are for the sensing electrodes and three of the inner rings of wider slots are for the driving electrodes. The remaining slots 122 can serve to structurally tune the resonator 100 (e.g., lower the frequency) and/or they may be occupied by bias electrodes which are used to actively bias the resonator in operation. The resonator and modal axes 124 are indicated; operation of the resonator identifies them as the pattern 120 is symmetric.

Although the exemplary resonator 100 is shown as a disc, other planar geometries using internal sensing and actuation are also possible applying principles of the present invention. In addition, the single central support 106 is desirable, providing complete isolation of the resonator, however, other mounting configurations using one or more additional mounting supports are also possible.

As employed in the resonator 100 described above, a centrally supported solid cylinder or disc has two degenerate in-plane radial modes suitable for Coriolis sensing, however the frequencies are very high (greater than 100 KHz) and the radial capacitance sensing area diminishes with cylinder height or disc thickness. However, the multi-slotted disc resonator 100, shown in FIGS. 1A and 1B overcomes these problems. By etching multiple annular slots through the cylinder or disc two immediate benefits result: two degenerate modes suitable for Coriolis sensing with low frequency (less than 50 KHz) and large sense, bias and drive capacitance. The low frequency derives from the increased radial compliance provided by the slots. The large sense, bias and drive capacitance is a consequence of the large number of slots that can be machined into the resonator.

Figure 1D:
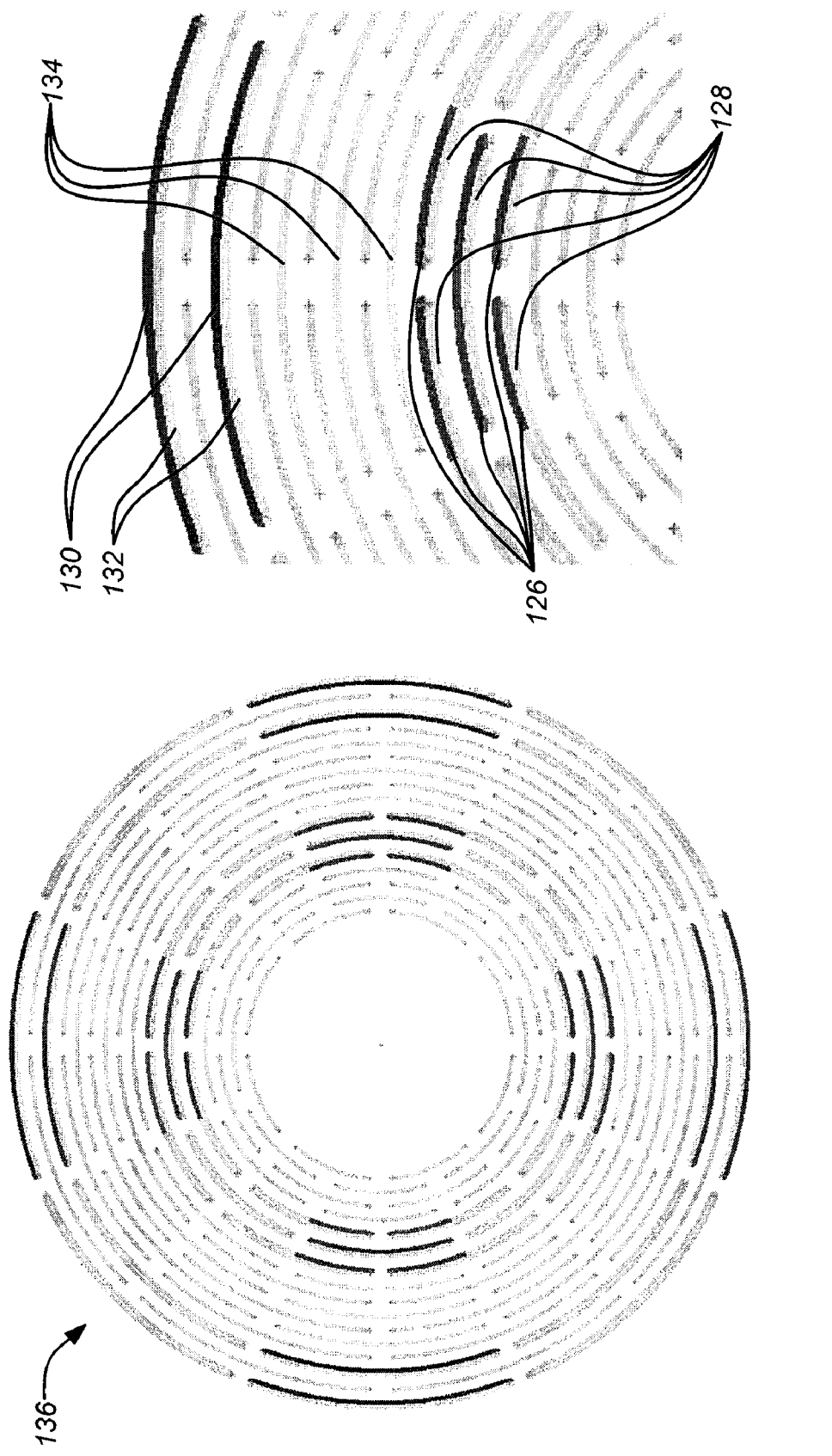
FIG. 1D illustrates conventional electrode operation for a first differential mode of the exemplary resonator to sense in plane rotation of the resonator.

FIG. 1D illustrates conventional electrode operation for a first differential mode of the resonator of FIG. 1C as may be used to sense in plane rotation of the resonator. The electrodes 136 that operate with a resonator 100 of the pattern 120 are shown in the left image. Four groups of electrodes 124 are used, each at a 90° interval around the circumference of the pattern. The negative excitation elements 126 and positive excitation elements 128, paired elements of the excitation electrodes, are driven to excite the resonator 100. These paired elements 126, 128 share a slot with the negative elements 126 in the outboard position and the positive elements 128 in the inboard position. Note also that as shown some of the pairs share a common slot with other distinct electrode pairs, illustrating that multiple separately operable electrodes can share a common resonator slot. The sensing electrodes are disposed at a larger radial position and include negative sensing elements 130 and positive sensing elements 132 which together provide output regarding motion of the resonator 100.

A uniform radial spacing between slots 116, 122 can be employed, but other spacing may also be used, provided two degenerate radial modes suitable for Coriolis sensing are maintained. In addition, in further embodiments, some or all of the segments 104A-104E can be further slotted such that a single beam segment is further divided into a composite segment including multiple parallel segments. Selective use of such composite segments can be used to adjust the frequency of the resonator as well as eliminate harmful thermoelastic effects on drift performance as the segments are stressed in operation of the resonator. Generally, adding slots to form composite circumferential segments lowers the resonator frequency. The effect of machining errors is also mitigated with multiple slots. Although such composite segments are preferably applied to the circumferential segments 104A-104E, the technique can also be applied to the radial segments 102A-102E or other designs with other segments in other resonator patterns.

Employing the in plane design described, embodiments of the present invention obtain many advantages over other out-of-plane sensors, particularly gyros. For example, the central support bond carries no vibratory loads, eliminating any friction possibility or anchor loss variability. In addition, simultaneous photolithographic machining of the resonator and electrodes is achieved via the slots. Furthermore, diametral electrode capacitances can be summed to eliminate vibration rectification and axial vibration does not change capacitance to a first order. Modal symmetry is also largely determined by photolithographic symmetry not wafer thickness as with other designs. Isolation and optimization of sense capacitance (e.g., from the outer slots) and drive capacitance (e.g., from the inner slots) is achieved. Embodiments of the invention also achieve a geometric scalable design to smaller or larger diameters and thinner or thicker wafers. In addition, embodiments of the invention can be entirely defined by slots of the same width for machining uniformity and symmetry. Implementation of the present invention can also accommodate silicon anisotropy producing frequency splits. For example, a <111> silicon wafer and/or a varied slot width can be used.

As mentioned above, high thermoelastic damping due to vibration frequency proximity to thermal relaxation resonance can result in short resonance decay times and high gyro drift. However, the slot radial spacing can be adjusted to define an optimum beam width and a number of slots can be additionally etched in between the slots defining the electrode gaps to further reduce the vibrating beam width. In one example, the disc resonator may have an overall diameter ranging from approximately 2 mm to 8 mm depending upon performance objectives and manufacturing considerations. However, embodiments of the invention are not limited to any particular disc resonator size.

3.0 Modeling Modes of the Disc Resonator for Sensing with Multiple Modes

Figure 2:
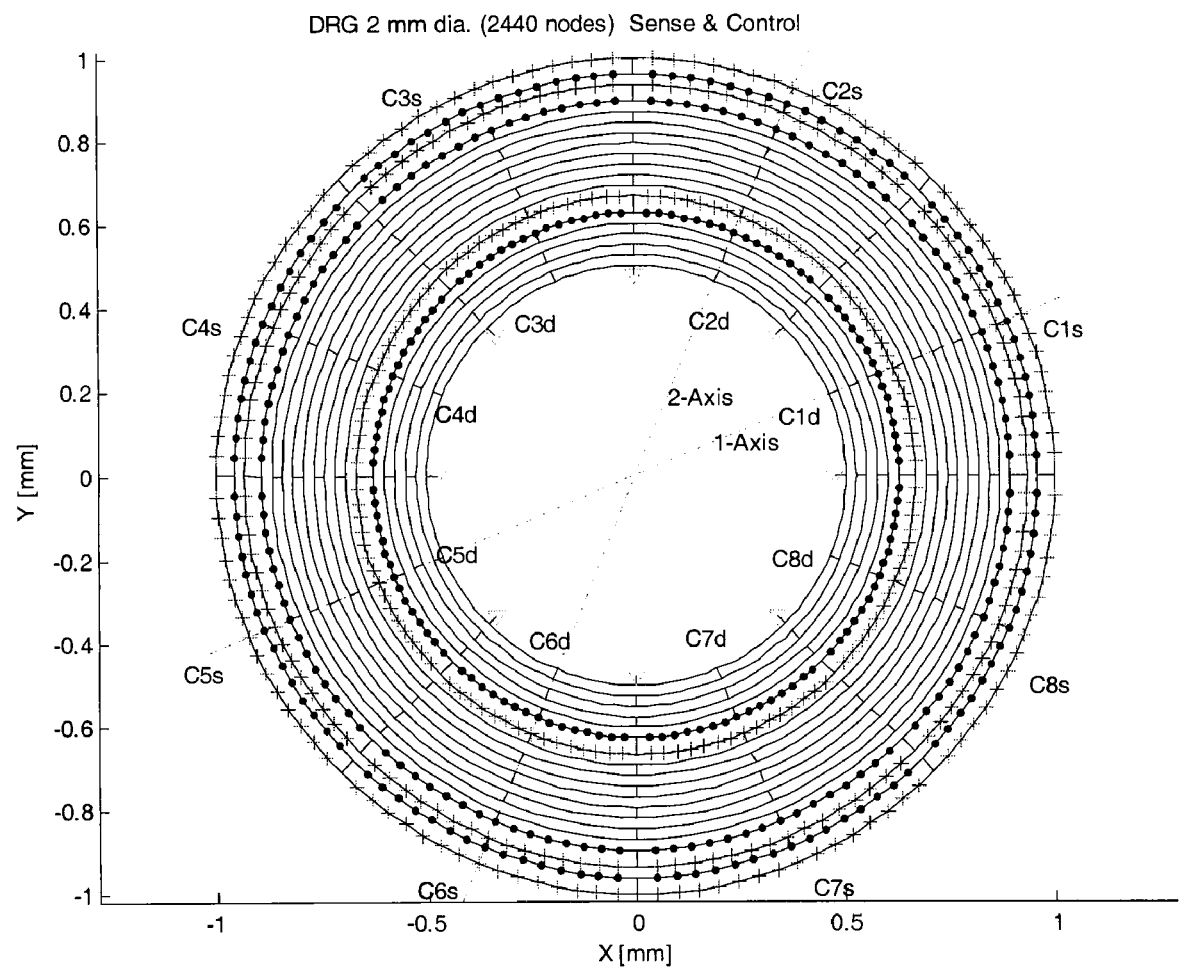
FIG. 2 illustrates a finite element model of a disc resonator to study various useful modes of the disc resonator for sensing with the ring segments marked that are adjacent to capacitive sense and drive electrodes.

FIG. 2 illustrates a finite element model of a disc resonator to study various useful modes of the disc resonator for sensing. The disc resonator model employs 2440 nodes and has a diameter of approximately 2 mm. Capacitive electrodes within the disc resonator are designated via adjacent ring segments with drive (or control) electrodes disposed around an inner ring of designated segments C1$d$ to C8$d$ and sense electrodes disposed around two outer rings of designated segments C1$s$ to C8$s$. Each drive and sense electrode segment is further divided into a separate paired elements that share a slot, indicated by either a "+" or a "●".

Sense and control electrodes are shown for in-plane drive using first n=2 mode (elliptical shape), yaw rate sensing, ωz, using second n=2 Coriolis mode, lateral, ax and longitudinal, ay acceleration sensing using n=1 mode. Sense and control of three out of plane modes for in plane rate sensing, ωx, ωy using degenerate rocking modes and axial acceleration sensing, az using axial mode requires vertical capacitive electrodes beneath or above disc (not shown in FIG. 2). The finite element analysis can be performed for two sizes of beam width: 2.15 μm defined as the "untuned resonator" case and 2.13 μm defined as the "closely tuned resonator" case. Tuning may be applied in manufacturing of the disc resonator in order to obtain a higher precision beam width between the slots of the disc resonator. A wafer thickness of 62.5 μm was used in both cases. Identification of the seven modes that may be used for a disc resonator in an integrated inertial measurement unit (IMU) can be seen in the following tables of results.

| UNTUNED RESONATOR | |
|---|---|
| Disc Resonator FEM (in-plane\out-of-plane strain) | |
| Ring Material | silicon |
| Outer Ring Radius | 1 mm |
| Number of Rings | 19 |
| Thickness of Wafer | 0.0625 mm |
| Width of Ring | 0.00215 mm |
| Width of Electrode | 0.0125 mm |

-continued

| UNTUNED RESONATOR | | | | | |
|---|---|---|---|---|---|
| Disc Resonator FEM (in-plane\out-of-plane strain) | | | | | |
| Capacitive Gap | | | 0.004 mm | | |
| Width of Spoke | | | 0.00215 mm | | |
| Width of Yoke | | | 0.00215 mm | | |
| T axis trim, hT1,2 | | | 0, 0 mm | | |
| X axis trim, hX1,2 | | | 0, 0 mm | | |
| Resonator bias | | | 15 volt | | |
| T axis bias, BT1,2 | | | 0, 0 volt | | |
| X axis bias, BX1,2 | | | 0, 0 volt | | |

| Mode | In-plane, Hz | Angular Gain* | mass mg | QTED | Out-of-plane, Hz |
|---|---|---|---|---|---|
| 1 | 10427.2 | 0.997 | 0.014 | 1e+007 | 4886.13 |
| 2 | 10427.2 | 0.997 | 0.014 | 1e+007 | 4886.13 |
| 3 | 11771.6 | 0.794 | 0.009 | 1e+007 | 11644.1 |
| 4 | 11771.6 | 0.794 | 0.009 | 1e+007 | 11644.1 |
| 5 | 16577.8 | 1e−006 | 0.012 | 1e+007 | 14329.6 |
| 6 | 19583 | 0.586 | 0.006 | 8.5565e+06 | 14329.6 |
| 7 | 19583 | 0.586 | 0.006 | 8.5565e+06 | 16569.4 |
| 8 | 26693.4 | 1e−006 | 0.006 | 6.2773e+06 | 32937.4 |
| 9 | 28327.6 | 1e−006 | 0.004 | 5.9152e+06 | 32937.4 |
| 10 | 33783.2 | 0.754 | 0.006 | 4.9599e+06 | 33025.6 |
| 11 | 33783.2 | 0.754 | 0.006 | 4.9599e+06 | 34397.8 |
| 12 | 34214.8 | 0.288 | 0.003 | 4.8974e+06 | 34397.8 |
| 13 | 34214.8 | 0.288 | 0.003 | 4.8974e+06 | 37003.6 |
| 14 | 35377.5 | 0.073 | 0.002 | 4.7364e+06 | 40912.1 |
| 15 | 35377.5 | 0.073 | 0.002 | 4.7364e+06 | 40912.1 |
| 16 | 38611 | 1e−006 | 0.006 | 4.3398e+06 | 40963.1 |

*Coriolis coupling of jth to (j + 1) th in-plane mode

| TUNED RESONATOR | |
|---|---|
| Disc Resonator FEM (in-plane\out-of-plane strain) | |
| Ring Material | silicon |
| Outer Ring Radius | 1 mm |
| Number of Rings | 19 |
| Thickness of Wafer | 0.0625 mm |
| Width of Ring | 0.00213 mm |
| Width of Electrode | 0.0125 mm |
| Capacitive Gap | 0.004 mm |
| Width of Spoke | 0.00215 mm |
| Width of Yoke | 0.00215 mm |
| T axis trim, hT1,2 | 0, 0 mm |
| X axis trim, hX1,2 | 0, 0 mm |
| Resonator bias | 15 volt |
| T axis bias, BT1,2 | 0, 0 volt |
| X axis bias, BX1,2 | 0, 0 volt |

| Mode | In-plane, Hz | Angular Gain* | mass mg | QTED | Out-of-plane, Hz |
|---|---|---|---|---|---|
| 1 | 10322.9 | 0.997 | 0.013 | 1e+007 | 4859.39 |
| 2 | 10322.9 | 0.997 | 0.013 | 1e+007 | 4859.39 |
| 3 | 11617.3 | 0.794 | 0.009 | 1e+007 | 11616.5 |
| 4 | 11617.3 | 0.794 | 0.009 | 1e+007 | 11616.5 |
| 5 | 16547.8 | 1e−006 | 0.012 | 1e+007 | 14235 |
| 6 | 19441.8 | 0.586 | 0.007 | 8.7813e+06 | 14235 |
| 7 | 19441.8 | 0.586 | 0.007 | 8.7813e+06 | 16530.1 |
| 8 | 26536.8 | 1e−006 | 0.006 | 6.4335e+06 | 32854.3 |
| 9 | 28175 | 1e−006 | 0.004 | 6.0594e+06 | 32858.8 |
| 10 | 33656.7 | 0.753 | 0.006 | 5.0725e+06 | 32858.8 |
| 11 | 33656.7 | 0.753 | 0.006 | 5.0725e+06 | 34289.9 |
| 12 | 34048.1 | 0.273 | 0.003 | 5.0142e+06 | 34289.9 |
| 13 | 34048.1 | 0.273 | 0.003 | 5.0142e+06 | 36717.3 |
| 14 | 35204.7 | 0.058 | 0.002 | 4.8495e+06 | 40802.6 |
| 15 | 35204.7 | 0.058 | 0.002 | 4.8495e+06 | 40808.8 |
| 16 | 38428.8 | 1e−006 | 0.006 | 4.4426e+06 | 40808.8 |

*Coriolis coupling of jth to (j + 1) th in-plane mode

From the FEM analysis results above, the in plane modes identified 1 to 4 are of interest. For the untuned resonator case, steady deflections, $d=g/(2\pi f)^2$ of in plane modes 1 and 2 with a frequency f=10,427 Hz for both provide sensing of two orthogonal in plane lateral accelerations, $g_x=gx$ or $g=gy$ (The orthogonal lateral accelerations may be referenced as lateral and longitudinal accelerations.) Deflection of these modes can be used to measure acceleration along two substantially orthogonal lateral in plane axes of the disc resonator. In plane mode 3 is the single reactionless drive mode, having a frequency of 11,771 Hz. Finally, in plane mode 4 is the in plane rotation sensing mode at the same frequency of 11,771 Hz. This mode provides rotation sensing about a substantially perpendicular out of plane axis of the disc resonator. All in plane modes may be operated using only internal electrodes with vertical electrodes (although tuning benefits of these modes can be derived from operation in conjunction with one or more vertical electrodes). Similar values are shown for the same in plane modes in the tuned resonator case.

The FEM analysis also shows that out of plane modes 3, 4 and 7 may be applied for additional sensing. For the untuned resonator case, steady deflections, $d=gz/(2\pi f)^2$ of out of plane mode 7 with a frequency of f=16,569 Hz provides gz acceleration sensing along a substantially vertical out of plane axis of the disc resonator. Out of plane modes 3 and 4 can provide rotation rate sensing about two orthogonal in plane axes of the resonator, both at a frequency of 11,644.1 Hz. Sensing with the out of plane modes requires one or more vertical electrodes above or below the plane of the disc resonator to operate. Similar values are shown for the same out of plane modes in the tuned resonator case.

Thus, a single centrally-supported etched-disc resonator can be modeled with seven sensed modes of vibration including two lateral and one axial vibration mode sensitive to accelerations along three orthogonal directions, an in-plane driven mode and three closely-tuned output modes coupled to the Coriolis accelerations produced by the driven mode motion and input inertial rates along three orthogonal axes.

4.0 Operation of the Disc Resonator Sensor with Multiple Degrees of Freedom

Embodiments of the invention are directed to new techniques for operating a disc resonator as generally described above in reference to FIGS. 1A-1D as a sensor in order to simultaneously sense motion in multiple degrees of freedom per the identified modes of the model of FIG. 2. Sensing in multiple degrees of freedom may be used in an IMU. A common disc resonator multi-axis inertial measurement (IMU) chip can be employed for surface vehicle (e.g., automotive, nautical, etc.) as well as aerospace vehicle applications.

Figure 3A:
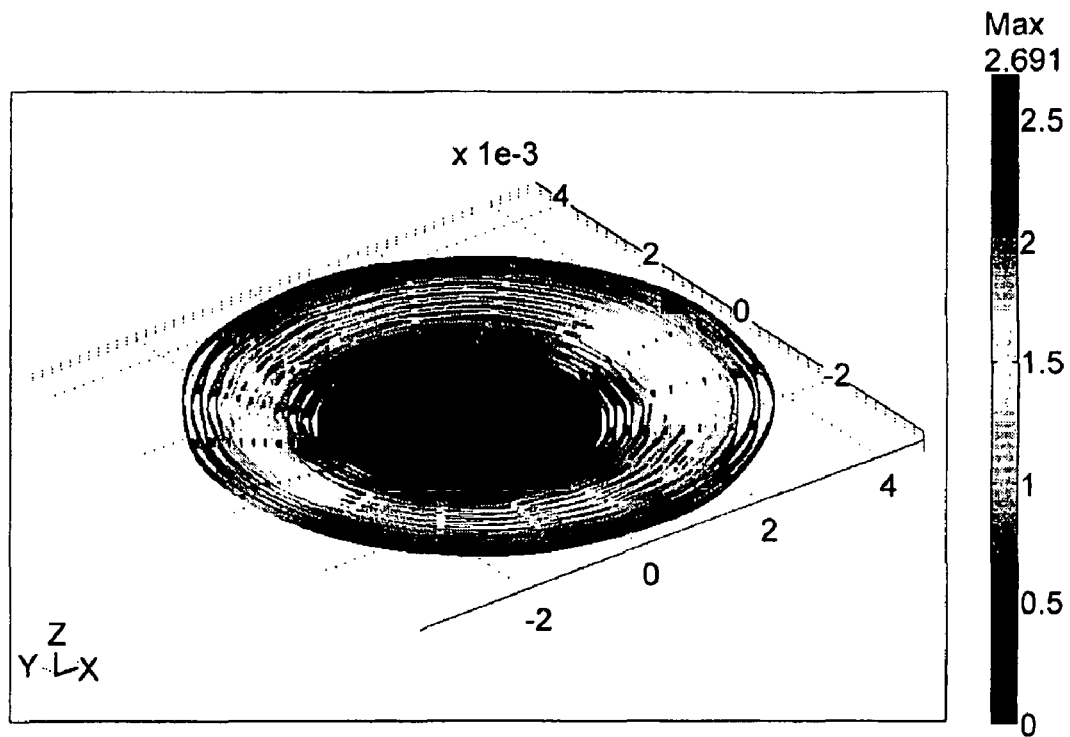
FIGS. 3A-3C illustrate three deflections or modes of the exemplary disc resonator that can be used to sense acceleration motion in three orthogonal axes.
Figure 3B:
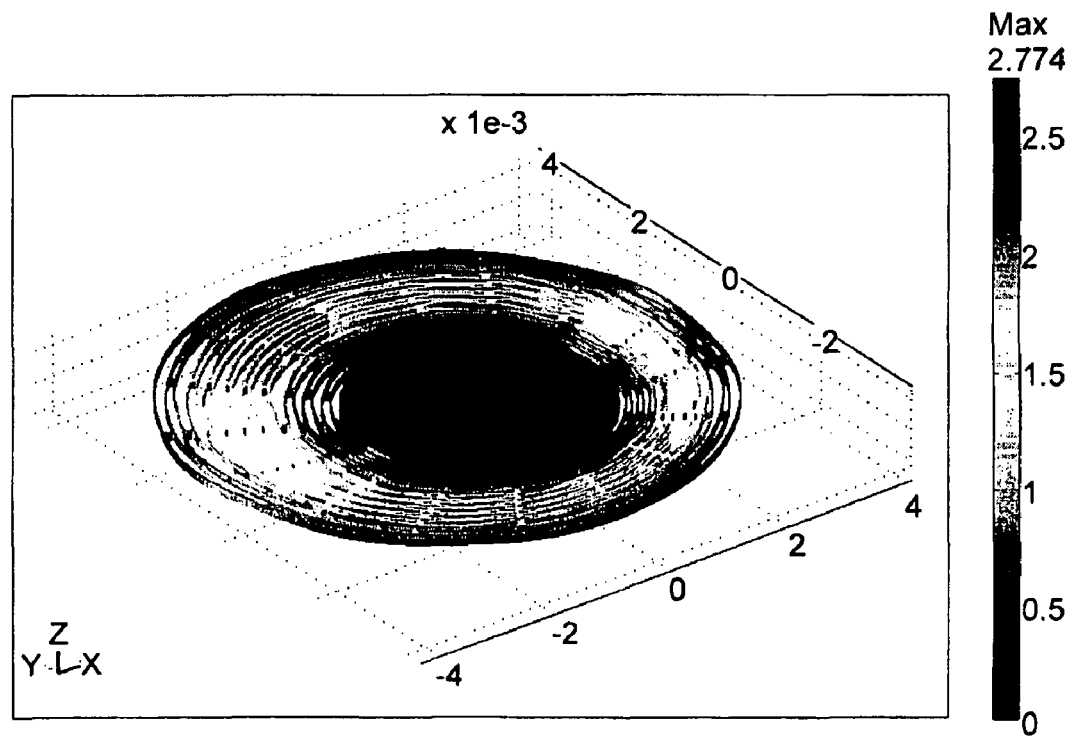
Figure 3C:
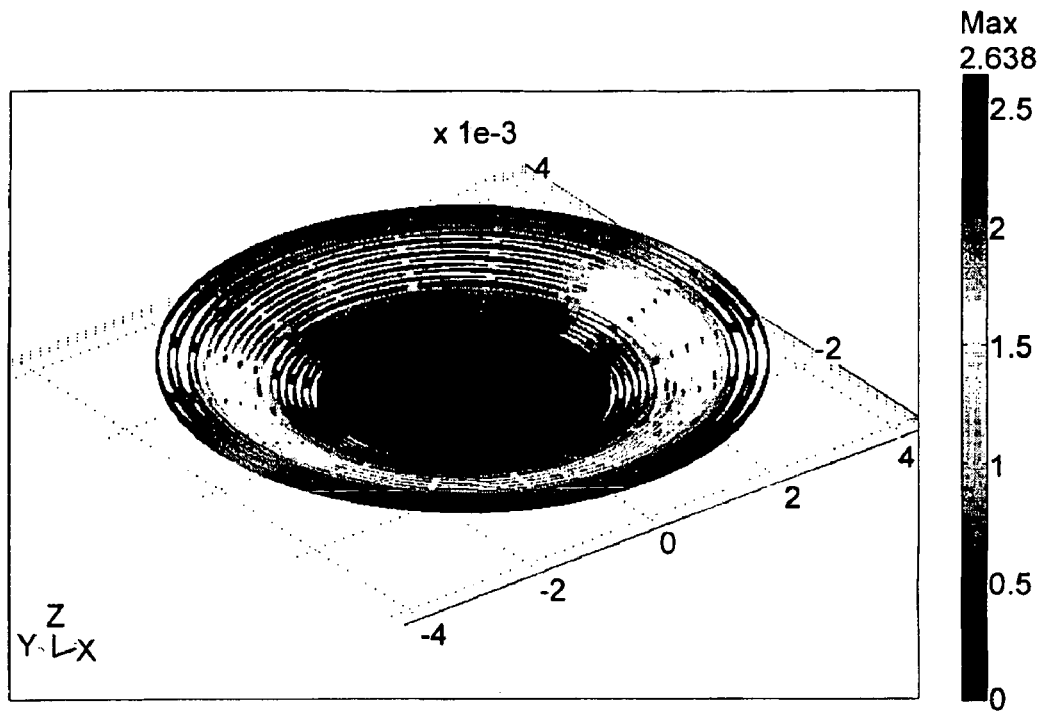

FIGS. 3A-3C illustrate three modes of the exemplary disc resonator that can be used to sense acceleration motion in three orthogonal axes. The first two dominant in-plane common modes define a pendulous accelerometer for X' and Y' axis in plane (lateral orthogonal) acceleration sensing as shown in FIGS. 3A and 3B, respectively. The first dominant axial mode defines a similar pendulous accelerometer but for out of plane Z-axis acceleration sensing as shown in FIG. 3C. (Note the out of plane concave mode shape of the disc.)

The steady deflection of a pendulous accelerometer with frequency $\omega x$ and for acceleration input g of the disc resonator is $d=g/\omega x^2$ or approximately 2.3 nm/g from estimated values of the model. Typical MEMS capacitance position sensitivity is much less than 1 pm/rt-Hz so sub mg sensitivity is possible. In order to detect a steady capacitance change, dC with a transimpedance amplifier (TIA) which senses current the resonator bias may be modulated by $Vc^*\sin(\omega c^*t)$ so that the current into the TIA is then $Vc^*\omega c^*\cos(\omega c^*t)^*dC$. Demodulation of the TIA outputs may be performed applying a technique similar to that described in U.S. patent application Ser. No. 11/615,872, filed Dec. 22, 2006, and entitled "VIBRATORY GYROSCOPE WITH PARASITIC MODE DAMPING", by David Whelan et al., which is incorporated by reference herein. The modulation, typically 10 times the resonator natural frequency, can be added to the fixed DC resonator bias used for sensing rate of change of capacitance for yaw rate sensing. Alternately, the resonator DC bias can be zero and the modulation can be used for both rate and acceleration sensing. An electronic noise design trade should be performed to optimize the approach.

Figure 4A:
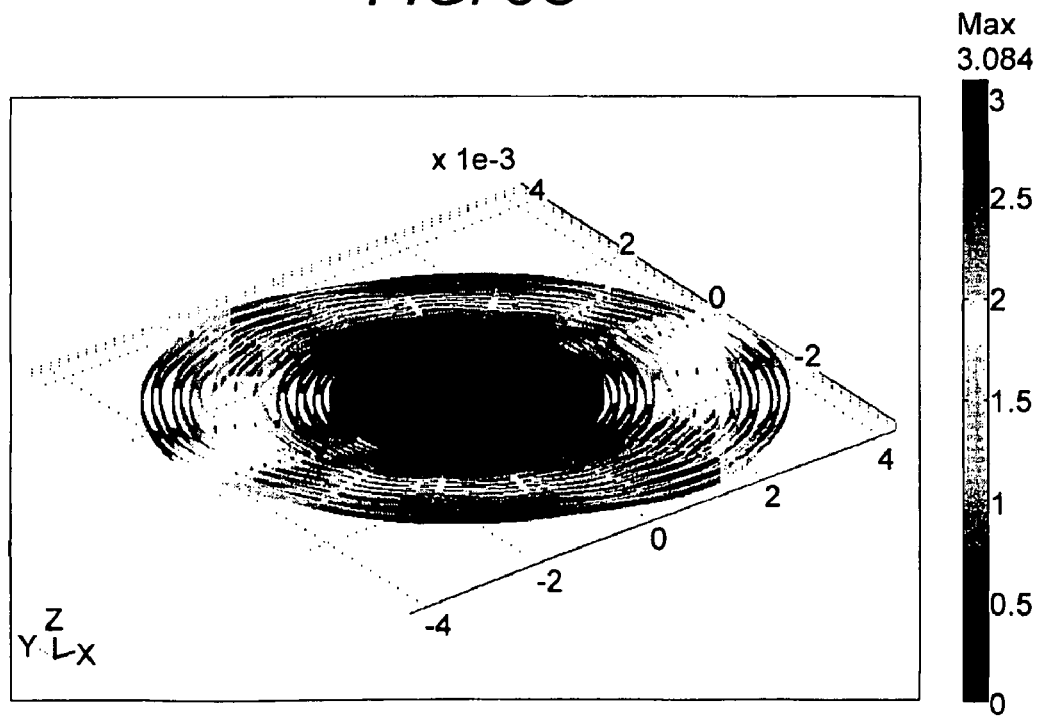
FIGS. 4A-4D illustrate modes of the exemplary disc resonator that can be used to sense rotation motion about three orthogonal axes.
Figure 4B:
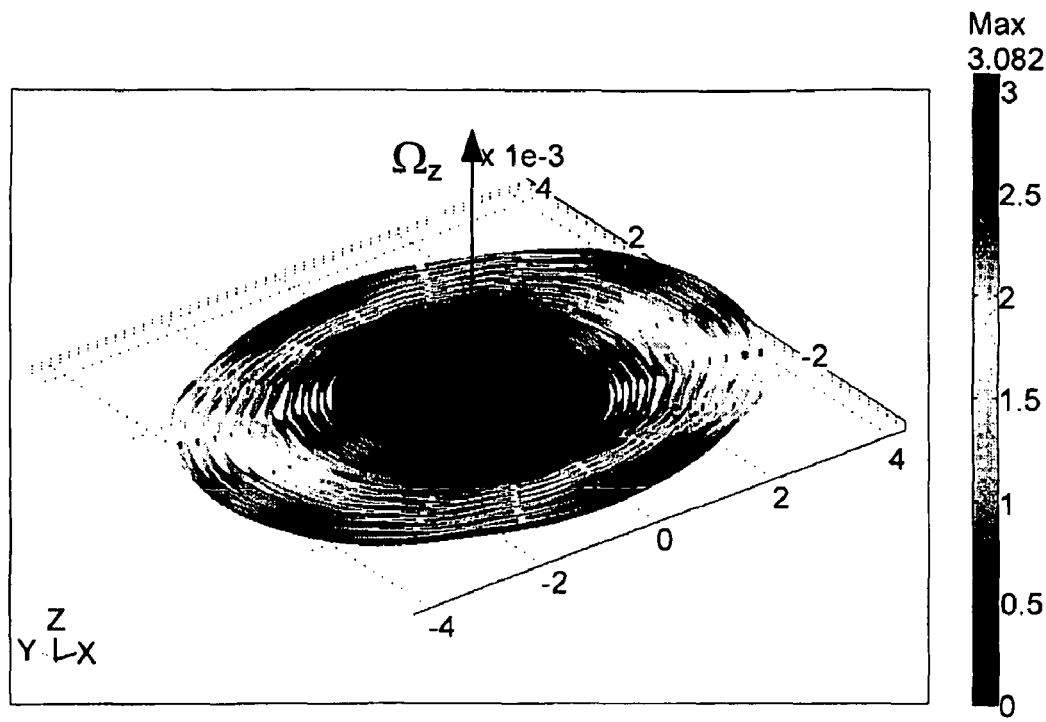
Figure 4C:
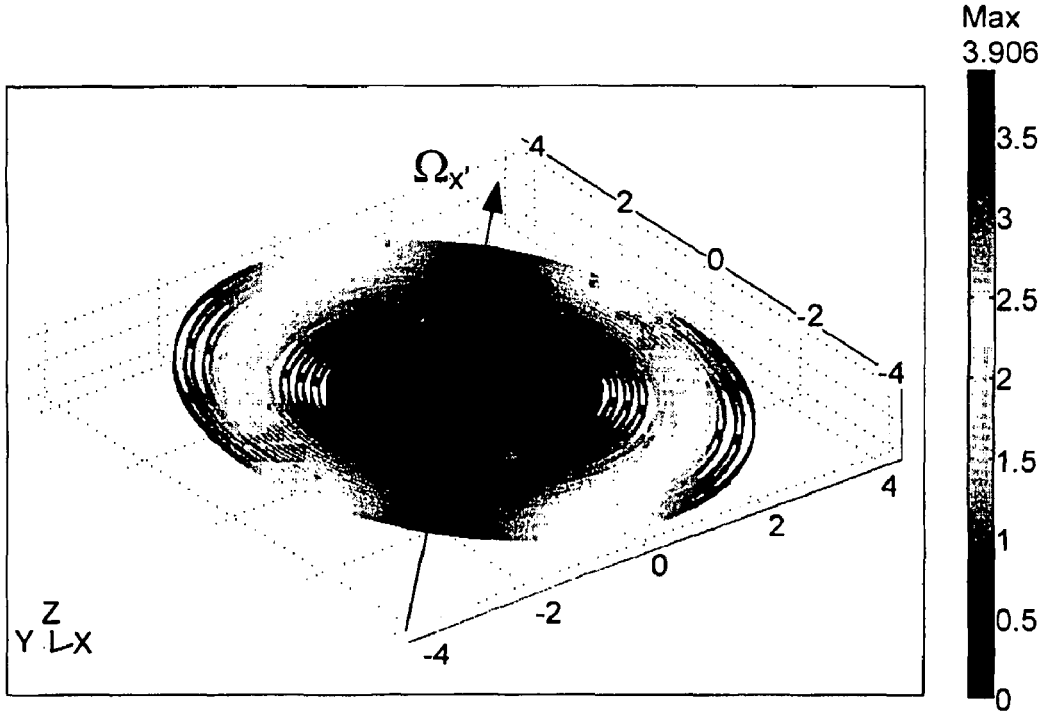
Figure 4D:
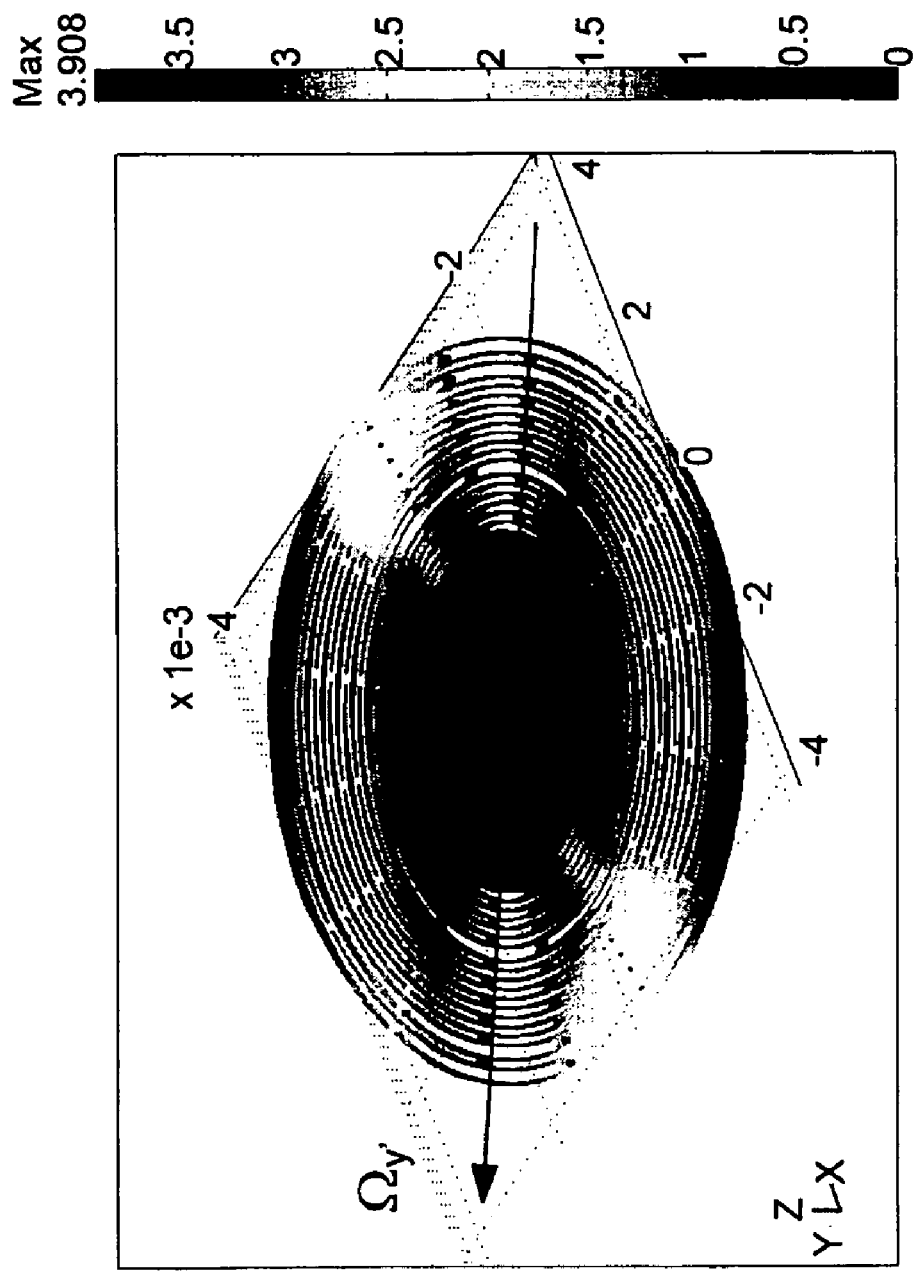

FIGS. 4A-4D illustrate modes of the exemplary disc resonator that can be used to sense rotation motion about three orthogonal axes. FIGS. 4A and 4B illustrate the reactionless drive mode and yaw rotation (in plane rotation) sensing mode, respectively. Note that the in plane rotation sensing mode yield a rotation rate vector that is perpendicular to the disc resonator plane along the z axis as shown. Operation of the disc resonator to derive in plane rotation sensing has been previously described. (See e.g., U.S. patent application Ser. No. 11/615,872.) FIGS. 4C and 4D illustrate the two out of plane rocking modes of the disc resonator which are used to sense pitch and roll rates. Similarly, the out of plane rotation sensing modes yield orthogonal rotation rate vectors in the X-Y plane of the disc resonator as shown. Operation of the disc resonator to derive the out of plane rotation sensing (pitch or roll) will be detailed hereafter to determine a pitch rotation rate measurement. Determining a roll rotation rate measurement is completely analogous as will be understood by those skilled in the art.

Figure 5:
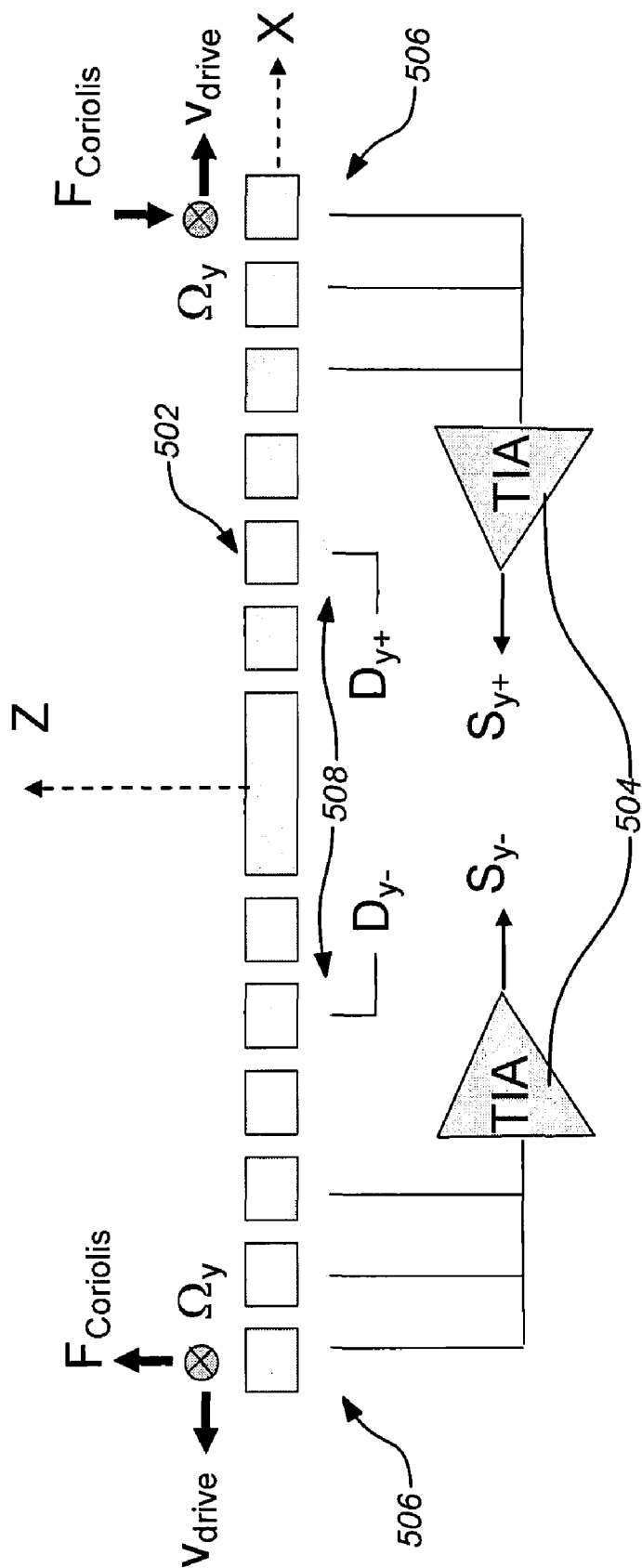
FIG. 5 illustrates operation of the disc resonator to measure pitch or roll rate.

FIG. 5 illustrates operation of the disc resonator 502 to measure pitch or roll rate. In the presence of driven mode motion, Vdrive, and Pitch (Y-axis inertial rate), $\omega y$, the resulting Coriolis forces excite the out of plane rocking mode about the Y-axis. Inputs from the transimpedance amplifiers 504 coupled to the vertical electrodes 506 (outside) can be collected, differentially summed (Sy+−Sy−) and demodulated either with the drive signal, S1, (applied to the driven mode) for open loop operation or with the force rebalance signal (Dy+−Dy−) from vertical electrodes 508 (inside) for closed loop operation to yield the desired pitch rate measurement output. Determining an orthogonal roll rotation rate measurement is completely analogous as previously mentioned. In addition, two out of plane rocking modes may be closely tuned by design to the drive mode of the disc resonator. This allows the driven elliptical in plane vibration to significantly couple in-plane inertial rate to the two out of plane rocking modes. Sx=Sx+−Sx− and Sy=Sy+−Sy− can be demodulated with the drive signal to yield the two roll/pitch ($\omega x/\omega y$) components of inertial rate.

For acceleration sensing, a sinusoidal carrier voltage may be applied to the resonator and the S1' and S2' outputs are demodulated for lateral and longitudinal acceleration sensing. For example, four vertical electrodes and associated transimpedance amplifier outputs, Vxp', Vxn', Vyp', and Vyn' may be summed and demodulated to sense vertical acceleration.

Applying all the defined disc resonator modes to achieve comprehensive sensing, a disc resonator may be operated with anti-nodal sense and control electrodes for its in-plane elliptical drive and sense modes with added anti-nodal sense and control electrodes as described in U.S. patent application Ser. No. 11/615,872 to sense and control the two lateral modes of vibration. Further, additional anti-nodal vertical sense and control electrodes beneath and/or above the disc resonator may be used for sensing and controlling of the axial mode (for vertical acceleration sensing) and the two rocking (out of plane) modes of vibration (for rotation rate sensing about two orthogonal in plane axes).

Furthermore, an example of suitable digital sensor control electronics which may be similarly applied to embodiments of the present invention as understood by those skilled in the art can be found in U.S. Pat. No. 6,915,215 by M'Closkey et al., issued Jul. 5, 2005, which is incorporated by reference herein. Alternately or in addition, analog control circuitry may be employed to operate the resonator as described herein. All desired motion measurements are derived from demodulating signals from the proper sense electrodes for the applicable modes of the disc resonator subject to excitation of the driven mode of the disc resonator and motion of the disc resonator in the applicable degrees of freedom. Separate circuit functions of driving and sensing with electrodes may be readily integrated into a single control circuit as will be understood by those skilled in the art (such as indicated by control circuit 144 of FIG. 1A).

Figure 6:
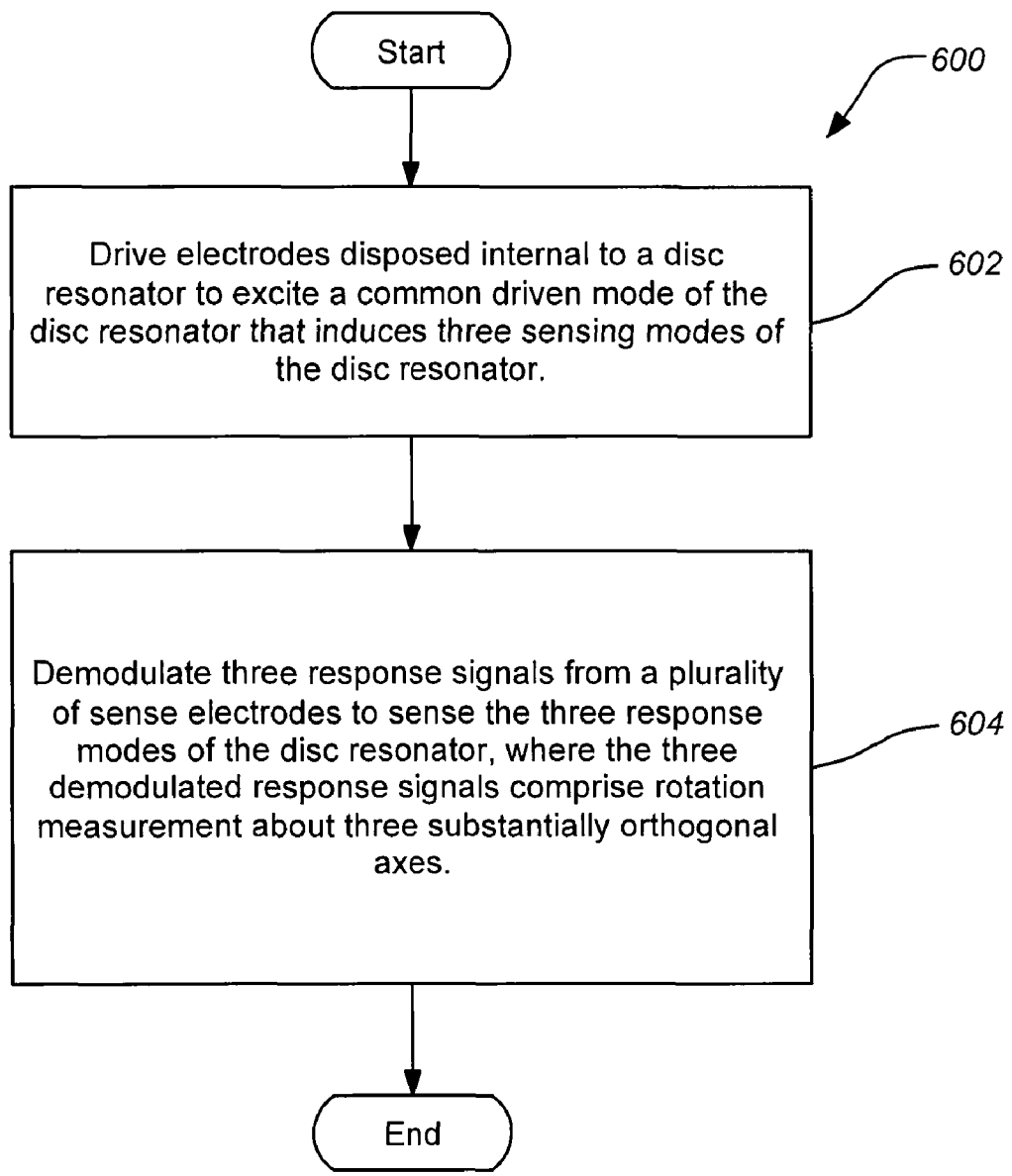
FIG. 6 is a flowchart of an exemplary method of operating a disc resonator according to the present invention.

FIG. 6 is a flowchart of an exemplary method of operating a disc resonator according to the present invention. The method 600 begins with an operation 602 of driving electrodes disposed internal to a disc resonator to excite a common driven mode of the disc resonator that induces three sensing modes of the disc resonator. Next, in operation 604 three response signals are demodulated from a plurality of sense electrodes to sense the three response modes of the disc resonator, where the three demodulated response signals comprise rotation measurement about three substantially orthogonal axes. Any rotation movement of the disc resonator in the multiple degrees of freedom will be measured in the demodulated response signals. This basic method 600 may be further modified as described above, to provide comprehensive sensing including acceleration and rotation sensing in three orthogonal axes for an IMU for example.

5.0 Disc Resonator Sensor Configurations in an Inertial Measurement Unit

Figure 7A:
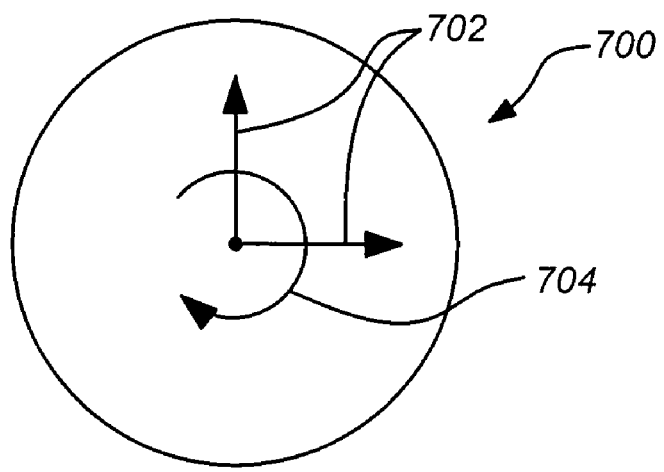
FIGS. 7A & 7B illustrate some example sensor configurations that may be used in an IMU.
Figure 7B:
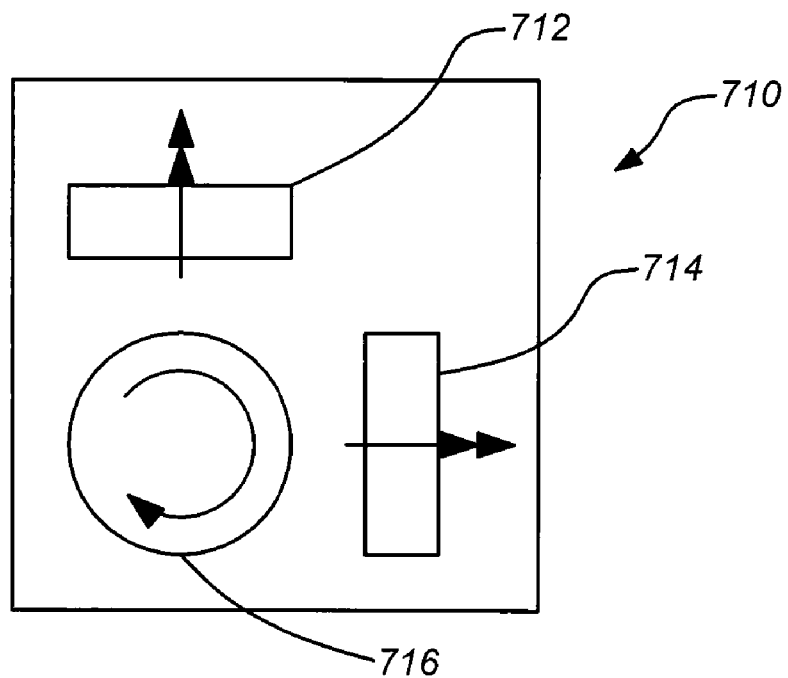

FIGS. 7A and 7B illustrate some example sensor configurations that may be used in an IMU. FIG. 7A illustrates an IMU 700 employing a single disc resonator. A single disc resonator IMU may be well suited for surface vehicle applications, such as automotive electronics stability control where there is no need for pitch or roll rate measurements or vertical acceleration measurements. In this case, sensing for the three remaining degrees of freedom, two orthogonal lateral acceleration axes 702 (in a horizontal plane) and a yaw rotation rate 704, can all be derived primarily through in plane modes of the disc resonator. Thus, vertical electrodes will not be required (except for possible parasitic mode damping or tuning to improve performance) when sensing of using these modes is performed as described above. There are several disc resonator IMU configurations that could be considered as a common IMU for low cost surface vehicle and aerospace applications. One that may be least costly is a planar single disc resonator IMU for three degree of freedom or six degree of freedom applications. Inertial rate sensing using the in plane disc mode should be the most accurate for a given chip area.

To achieve six degree of freedom single disc resonator IMU providing comprehensive sensing, the disc resonator must be operated to sense both roll and pitch (using out of plane rocking modes) as well as yaw (using the original Coriolis in plane mode) in addition to providing acceleration sensing along two orthogonal in plane axes and the remaining out of plane axis. Beam parameters may be selected to initially tune the disc resonator's two out-of-plane rocking-modes close to its in-plane Coriolis mode frequency (e.g., 11,664 Hz compared with 11,771 Hz as shown in the foregoing 2 mm disc FEA example). One of these degenerate Coriolis modes can serve as the common drive mode (as shown in FIG. 4A) for all three axes. Laser and/or electrostatic trimming (tuning) of the disc resonator can be used to trim the lateral and rocking mode frequencies to degeneracy. Alternately, untuned open loop operation may also be employed to operate the disc resonator.

FIG. 7B illustrates a disc resonator IMU 710 using three disc resonators 712, 714, 716 in a non-planar configuration. Each disc resonator 712, 714, 716 is used to sense rotation using the in plane mode and the disc resonator. This configuration may achieve better performance than a six degree of freedom single disc resonator IMU, particularly, for performance-sensitive aerospace applications. In very similar configurations, other disc resonator IMUs for aerospace may comprise three very low cost electronic stability control chips discretely mounted on an IMU cube or cut cube. This can provide three high performance rate sensing axes optimized for high performance aerospace navigation and pointing applications.

For high production volume automotive applications, a low cost three degree of freedom IMU may be employed for electronic stability control in the 100 to 20 deg/h performance range. For much lower production volume navigation and flight control of very compact aerospace vehicles, a six degree of freedom IMU may be used with performance under 20 deg/h. A six degree of freedom IMU comprising three electronic stability control chips, each being a three degree of freedom sensor, may yield a very low cost IMU suitable for aerospace applications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method of sensing, comprising the steps of:
    driving a disc resonator to excite a common driven mode of the disc resonator that induces three sensing modes of the disc resonator; and
    demodulating three response signals from a plurality of sense electrodes to sense three response modes of the disc resonator;
    wherein the three demodulated response signals comprise rotation measurement about three substantially orthogonal axes and the disc resonator comprises a circumferentially slotted disc and a plurality of drive electrodes and at least some of the plurality of sense electrodes are internal sense electrodes disposed within slots of the disc resonator and the common driven mode comprises a reactionless disc mode.

2. The method of claim 1, wherein the common driven mode and the three response modes operate at a common frequency.

3. The method of claim 2, wherein the disc resonator is tuned such that the common driven mode and the three sensing modes operate at the common frequency.

4. The method of claim 1, further comprising sensing acceleration along two substantially orthogonal lateral in plane axes of the disc resonator measured with the internal sense electrodes of the disc resonator.

5. The method of claim 1, wherein one of the three response modes comprises an in-plane elliptical mode for measuring an in plane rotation rate about a substantially perpendicular out of plane axis of the disc resonator.

6. The method of claim 1, wherein the plurality of sense electrodes comprise one or more vertical electrodes adjacent to a planar side of the disc resonator.

7. The method of claim 6, further comprising sensing acceleration along a substantially vertical out of plane axis of the disc resonator measured with the one or more vertical electrodes adjacent to the planar side of the disc resonator.

8. The method of claim 6, wherein two of the three response modes each comprise an out of plane rocking mode of the disc resonator for measuring an out of plane rotation rate about a substantially in plane axis of the disc resonator measured with the one or more vertical electrodes adjacent to the planar side of the disc resonator.

9. The method of claim 8, further comprising sensing acceleration along two substantially orthogonal lateral in plane axes of the disc resonator measured with the internal sense electrodes of the disc resonator; and
sensing acceleration along a substantially vertical out of plane axis of the disc resonator measured with the one or more vertical electrodes adjacent to the planar side of the disc resonator sensing an out of plane mode of the disc resonator;
wherein a remaining one of the three response modes comprises an in-plane elliptical mode for measuring an in plane rotation rate about a substantially perpendicular out of plane axis of the disc resonator.

10. A sensor, comprising:
a centrally mounted disc resonator including a drive electrode disposed internal to the disc resonator and a plurality of sense electrodes;
a drive circuit for applying a sinusoidal carrier voltage to the drive electrode to excite a common driven mode of the disc resonator that induces three sensing modes of the disc resonator; and
a sense circuit for demodulating three response signals from the plurality of sense electrodes to sense three response modes of the disc resonator, where the three demodulated response signals comprise rotation measurement about three substantially orthogonal axes;
wherein the disc resonator comprises a circumferentially slotted disc and a plurality of drive electrodes and at least some of the plurality of sense electrodes are internal sense electrodes disposed within slots of the disc resonator and the common driven mode comprises a reactionless disc mode.

11. The sensor of claim 10, wherein the common driven mode and the three response modes operate at a common frequency.

12. The sensor of claim 11, wherein the disc resonator is tuned such that the common driven mode and the three sensing modes operate at the common frequency.

13. The sensor of claim 10, wherein acceleration is sensed along two substantially orthogonal lateral in plane axes of the disc resonator measured with the internal sense electrodes of the disc resonator.

14. The sensor of claim 10, wherein one of the three response modes comprises an in-plane elliptical mode for measuring an in plane rotation rate about a substantially perpendicular out of plane axis of the disc resonator.

15. The sensor of claim 10, wherein the plurality of sense electrodes comprise one or more vertical electrodes adjacent to a planar side of the disc resonator.

16. The sensor of claim 15, wherein acceleration is sensed along a substantially vertical out of plane axis of the disc resonator measured with the one or more vertical electrodes adjacent to the planar side of the disc resonator.

17. The sensor of claim 15, wherein two of the three response modes each comprise an out of plane rocking mode of the disc resonator for measuring an out of plane rotation rate about a substantially in plane axis of the disc resonator measured with the one or more vertical electrodes adjacent to the planar side of the disc resonator.

18. The sensor of claim 17, wherein acceleration is sensed along two substantially orthogonal lateral in plane axes of the disc resonator measured with the internal sense electrodes of the disc resonator and along a substantially vertical out of plane axis of the disc resonator measured with the one or more vertical electrodes adjacent to the planar side of the disc resonator sensing an out of plane mode of the disc resonator; and
wherein a remaining one of the three response modes comprises an in-plane elliptical mode for measuring an in plane rotation rate about a substantially perpendicular out of plane axis of the disc resonator.

* * * * *